United States Patent
Chao et al.

(10) Patent No.: US 6,180,894 B1
(45) Date of Patent: Jan. 30, 2001

(54) DUAL MODE DIGITIZER TABLET SYSTEM

(75) Inventors: Ching-Chuan Chao, Sang Chung; Chia-Jui Yeh, Taipei, both of (TW)

(73) Assignee: Aiptek International Inc., Hsinchu (TW)

( * ) Notice: Under 35 U.S.C. 154(b), the term of this patent shall be extended for 0 days.

(21) Appl. No.: 09/074,640

(22) Filed: May 7, 1998

(51) Int. Cl.[7] .................................................. G06K 11/06
(52) U.S. Cl. ........................................ 178/18.03; 345/179
(58) Field of Search ...................................... 345/178, 179, 345/163, 213; 178/19.01, 18.03

(56) References Cited

U.S. PATENT DOCUMENTS 5,557,076 * 9/1996 Wieczorek et al. .................... 345/178
5,600,105 * 2/1997 Fukuzaki et al. ..................... 345/179

* cited by examiner

Primary Examiner—Richard A. Hjerpe
Assistant Examiner—Ali Zainani

(57) ABSTRACT

An apparatus for automatically changing the operation of a dual-mode digitizer tablet system. The system comprises a cordless pen device generating an electromagnetic wave of a variable frequency and a cordless mouse device generating an electromagnetic wave of a different frequency. The cordless pen device operates in an absolute mode and the cordless mouse device operates in a relative movement mode. The apparatus comprises a detection loop sensing circuit for detecting electromagnetic waves and a signal processing circuit for extracting the signal of either the pen device or the mouse device. The extracted signal is rectified and digitized for determining the position of the cordless pointing device by a micro-controller. A frequency counter determines the frequency of the detected signal. By detecting and determining the frequency of the electromagnetic wave received in the tablet system, the operation mode is adjusted automatically.

7 Claims, 4 Drawing Sheets

DUAL MODE DIGITIZER TABLET SYSTEM

FIELD OF THE INVENTION

The present invention relates to a dual mode digitizer tablet system comprising a tablet and cordless pointing devices, and more specifically to the operation mode switching between a cordless mouse and a cordless pen.

BACKGROUND OF THE INVENTION

A typical prior art tablet digitizer system has a tablet and a transducer/cursor in the form of a pen or a puck. As is well known, there are two operation modes for determining the position of a pointing device on the surface of a digitizer tablet. One is a relative mode, and the other is an absolute mode.

A mouse device operates in a relative mode. The computer sensing the inputs from a mouse recognizes only relative movements of the mouse in X and Y directions as it is slid over the surface on which it is resting. If the mouse is lifted and repositioned on the surface, no change in the signal to the computer will be detected. A common approach uses a sensing apparatus inside the mouse to develop a pair of changing signals corresponding to the longitudinal and transversal movements of the mouse.

In contrast, a cursor device (such as a pen or a puck) in a digitizer tablet system operates in an absolute mode. If a cursor device is lifted and moved to a new position on its supporting surface, its signal to a computer will change to reflect the new absolute position of the cursor device. Various methods have been used to determine the position of a cursor device on the surface of its supporting tablet. One common approach is electromagnetic field sensing.

Early transducer/cursors were connected to the tablet by means of a multi-conductor cable through which the position and button/pressure information are transferred virtually without any problem. As cordless pointing devices become popular, it is critical that the button functions and positional status of a pointing device can be passed efficiently and correctly.

The cordless transducer/cursors in some of the prior arts have attempted to use frequency and/or phase changes to transmit the non-positional status of the transducer/cursor functions such as buttons pushed, pen pressure, or the like. However, if there is no sophisticated processing, frequency and phase changes are very prone to false reading resulting from several outside factors such as metal objects, noise, wireless electromagnetic wave and so on. These problems become more apparent, especially in a larger digitizer tablet.

Improvements have also been made in the prior arts to allow a user to use pointing devices on a digitizer tablet system in dual modes of operation that can provide information of either a relative movement or an absolute position under the control of the user.

However, this type of system has some disadvantages. One is that operating the pointing device in either a relative mode or an absolute mode is user-controlled but not automatically detected by the digitizer tablet system itself. Another disadvantage is that a position history table means is needed in order for the user to selectively control the use of the cursor device as an absolute position or as a relative movement device.

From the foregoing discussions, there is a need in the art for effectively and automatically detecting the pointing devices in a digitizer tablet system so that the digitizer tablet system may accommodate the dual operation modes by itself.

SUMMARY OF THE INVENSION

This invention has been made to overcome the above mentioned drawbacks and inefficiencies for a digitizer tablet system comprising a tablet and cordless pointing devices. A principle object of the present invention is to provide a digitizer tablet system that receives the input signals from the pointing devices and is adjusted to accommodate changing circumstances, in order to automatically characterize the pointing devices. Also, it allows user selectively control the use of the pointing device as an absolute position device or as a relative movement device on the surface of the digitizer tablet system.

In accomplishing that object, it is another object of the present invention to provide a method and an apparatus for automatically detecting the frequencies of the input signals from the pointing devices. The intelligent digitizer tablet system of the present invention is adjusted to accommodate the changing operation modes of the pointing devices based on the frequency of the received signal.

It is a further object of the invention to provide a principle that can easily obtain the relative movement (such as mouse) or absolute position (such as pen) on the surface of the tablet system for the pointing devices. Accordingly, the digitizer tablet system of the present invention can increase operation accuracy, calculate the coordinate position at a very high speed, and save the electrical power for the whole system.

The foregoing and other objects, features, aspects and advantages of the present invention will become more apparent from the detailed description provided below, with reference to the accompanying drawings.

DETAILED DESCRIPTION OF THE PREFERRED EMBODIMENTS

Figure 1:
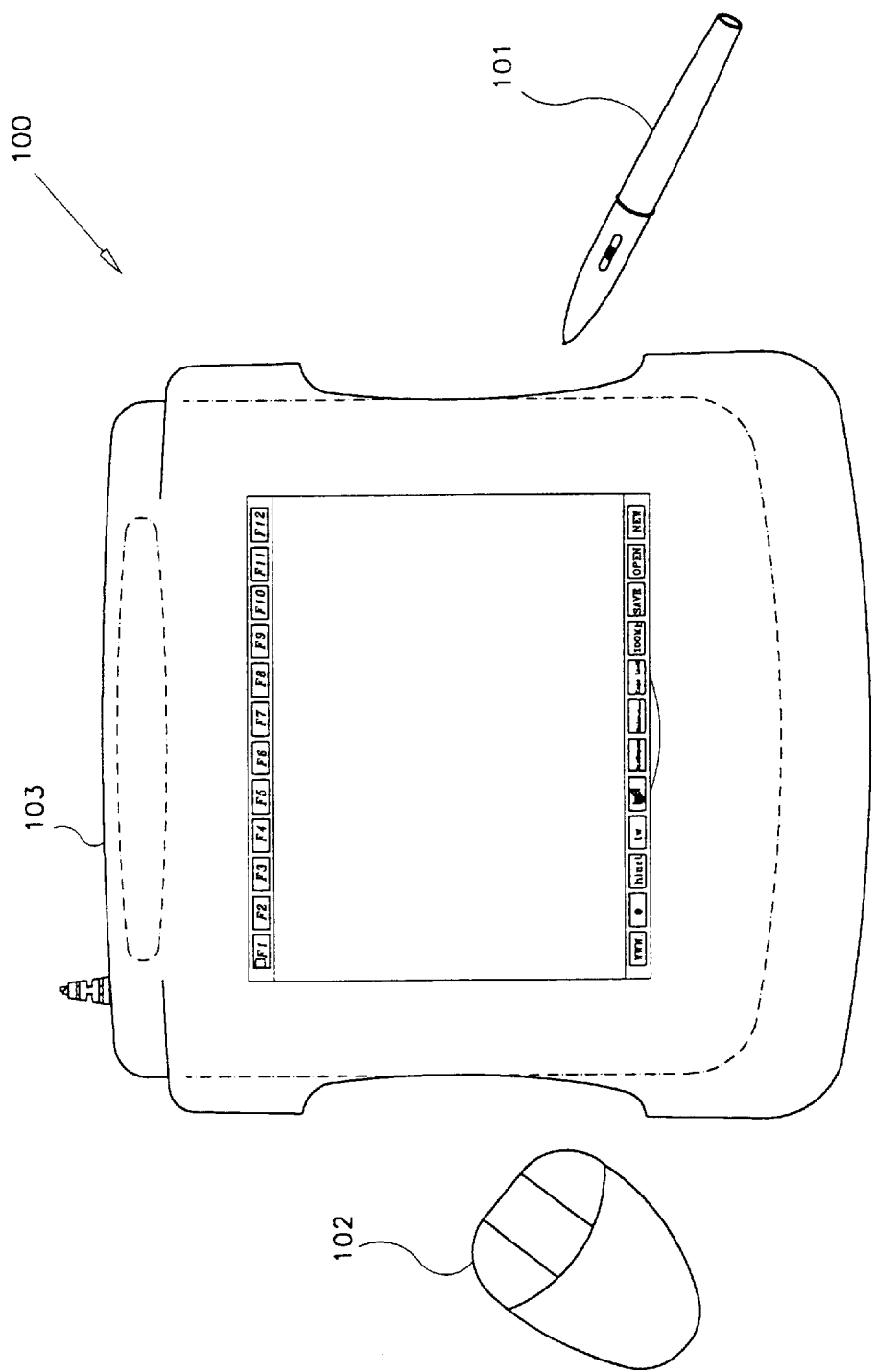
FIG. 1 is a simplified top view of a digitizer according to a preferred embodiment of the present invention.

Referring now to FIG. 1, a digitizer tablet system 100 is shown according to one embodiment of the present invention. Digitizer tablet system 100 comprises a cordless pen 101, a cordless mouse 102 and a tablet system 103. The cordless mouse 102 transmits an electromagnetic wave. The cordless pen 101 is capable of transmitting a variable frequency electromagnetic wave. The tablet system 103 automatically detects the signal from either the cordless pen 101 or the cordless mouse 102 to accommodate the operation mode change between the cordless pen 101 and the cordless mouse 102.

Figure 2:
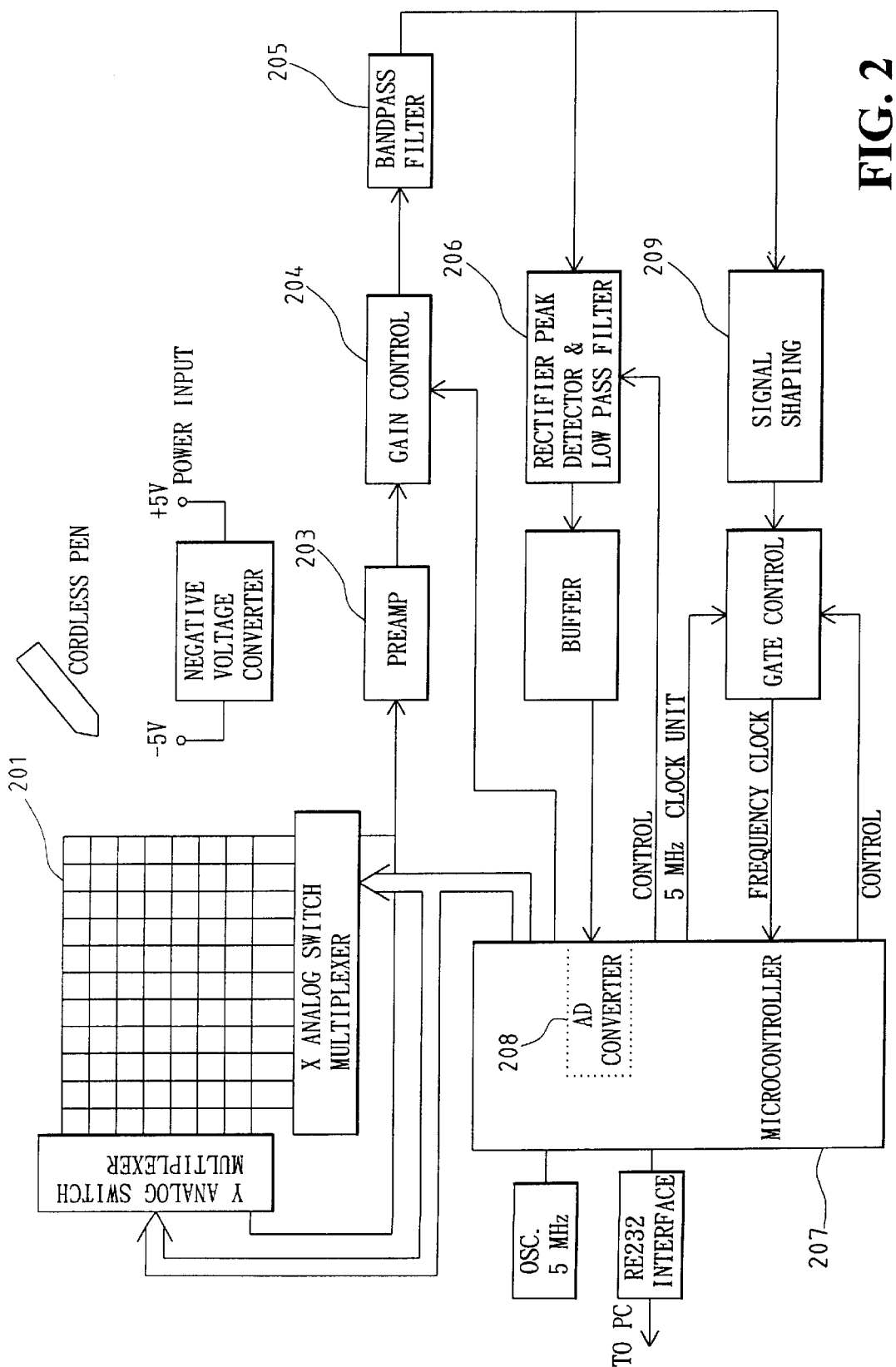
FIG. 2 is a block diagram showing the overall architecture and operations of the present invention for using a digitizer such as that of FIG. 1 when employing a cordless pen.

FIG. 2 is a block diagram showing the overall architecture and operations of the present invention for using a cordless pen in a digitizer tablet system of FIG. 1. The PCB (printed circuit board) in the tablet system 103 of FIG. 1 is covered with detection loop sensing circuits on its top and bottom sides. The detection loop sensing circuit 201 as shown in FIG. 2 is divided into two sensing systems, one for the X-axis and the other for the Y-axis. The surface of the detection loop sensing circuit 201 is covered with a shielding copper wire loop to prevent interference from noise.

When the digitizer tablet system is turned on, a system timing clock generator (not shown) scans X-axis and Y-axis of the global area at each predetermined time slot according to the order of encoding circuit. Under the control of a de-multiplexer, detection loop sensing circuit 201 starts scanning from the initial point extending in the X-direction and Y-direction by the means of time-sharing and multitasking. And, the received electromagnetic wave signal is sequentially sent to a multi-channel selector, an inverted amplifier 203, a feedback amplifier 204 and a high order band pass filter 205. The signal can be isolated from noise, and the original analog signal is completely recovered from the signal.

The output of the band pass filter 205 is sent to two different paths. The first path includes a half-wave rectifier, a peak detector and a low pass filter 206. In the first path, the signal is half-wave rectified and then sent to an analog to digital converter 208 in a micro-controller 207. The digitized signal is stored in the data memory in the micro-controller. The position of the cordless pen can be calculated using a conventional approach which is not the subject of this invention.

After obtaining the X-coordinate and Y-coordinate of the pen position in the global area from the signals, the digitizer tablet system changes its method of scanning. The scanning area only focuses on the local area around the reference position which is found in the global scanning. The signals obtained from the scanned local area are also sent to the same circuit mentioned above to be processed and calculated. In this manner, a new X and Y coordinates can be achieved by only adding offset values to the reference position.

Because new X and Y coordinates are achieved without re-scanning the global area, the digitizer tablet system of the present invention can increase operation accuracy, calculate the coordinate position at a very high speed, and save the electrical power for the whole system.

While the coordinates for the received signals are determined, the output signal of the band-pass filter is also sent to the second path. The signal is passed through a signal shaping circuit to shape sine waves into square waves. A frequency divider then converts the signal into a square wave of lower frequency for frequency counting.

The characteristic for the signal frequency can determine whether the signal comes from a cordless mouse or a cordless pen. The method for determining the signal sources is illustrated in more detail in FIG. 3 and the flow chart of FIG. 4. If the signal comes from a cordless mouse, the operation of the digitizer tablet system is switched into a relative mode. On the other hand, if the signal comes from a cordless pen, the operation of the digitizer tablet system is switched into an absolute mode.

Figure 3:
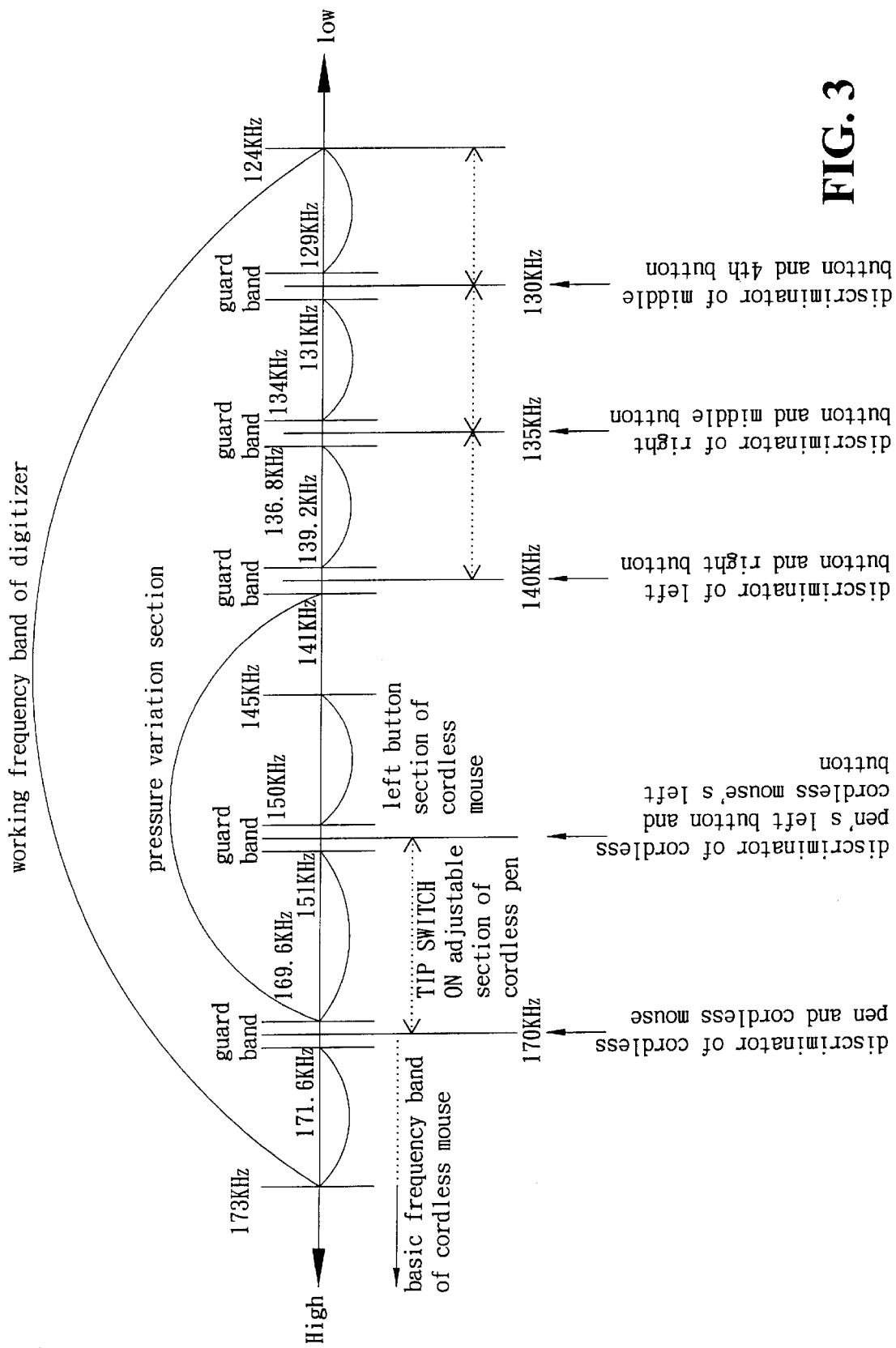
FIG. 3 shows different frequency bands of the frequency spectrum employed in a preferred embodiment of the present invention.

As shown in FIG. 3, the frequency bandwidth of electromagnetic waves is divided into several sections. Each section is reserved for a certain function of a particular pointing device. As can be seen from the example of FIG. 3, the basic operating frequency of the cordless mouse is between 171.6 kHz and 173 kHz. The frequency between 151 kHz and 169.6 kHz is reserved for the first button (tip switch on) of the cordless pen. The signal for the first button (left button) of the mouse has an operating frequency between 145 kHz and 150 kHz. The frequency bands from 136.8 kHz to 139.2 kHz, 131 kHz to 134 kHz and 124 kHz to 129 kHz are reserved for the second, third and fourth buttons of the cordless pen respectively. A guard band exists between every two frequency bands to help the distinction of two functions.

The preferred embodiment of this invention uses the frequency bandwidth as described above. These frequency bands are stored in the micro-controller as reference points. When a signal is received, the operation of the tablet can be switched to a correct mode based on these reference points.

There are several factors in selecting the frequency band for the tablet system of this invention. As is known, the screen of a computer terminal is easily interfered by electromagnetic waves below 100 kHz. The speed of scanning process may be too low when the frequency used in a digitizer is lower than 100 kHz. To generate higher frequencies, the component used in a signal generator requires a higher slew rate and is more costly. A tablet system also consumes more power if its signal frequency is higher. Considering the trade-off, as illustrated in the FIG. 3, the frequency from 124 kHz to 173 KHz is selected as a preferred frequency bandwidth for this invention.

In a practical operation, the frequency of the signals from pointing devices may be affected by several factors such as induced frequency change due to an environment, a product adjustment tolerance, frequency detecting error tolerance and so on. The guard bands as shown in FIG. 3 assure that a frequency section can be clearly identified for the frequency detected from the received signal. The center frequencies of the guard bands are used to determine which frequency section a received signal belongs to.

Figure 4:
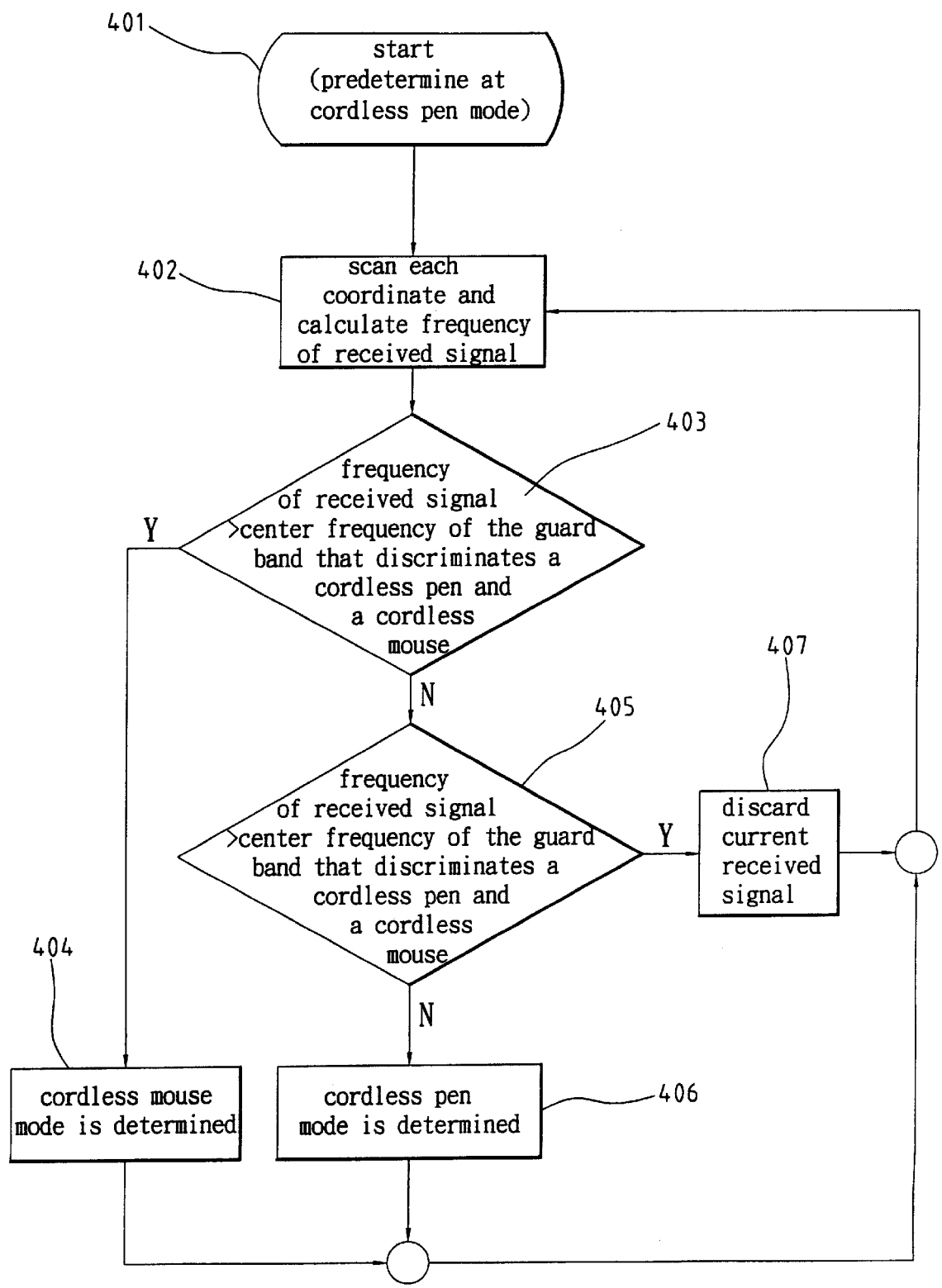
FIG. 4 is a flow chart showing the steps in the method of the present invention for determining an operation mode when employing a pointing device on a dual-mode digitizer tablet system.

FIG. 4 is a flowchart illustrating how an operation mode (absolute mode or relative mode) is determined when a pointing device is employed on the surface of a tablet system according to the present invention.

As shown in FIG. 4, at step 401, once the digitizer tablet system is turned on, the operation mode is initially preset in an absolute mode, assuming that the employed device is a cordless pen. The system starts from an initial point and scans both X-direction and Y-direction. It also calculates the frequency of the received signal (step 402).

To determine an operation mode when a pointing device is employed, at step 403, the frequency of the received signal is compared with the center frequency of the guard band that separates a cordless pen and a cordless mouse. If the frequency of the received signal is lower, then a cordless mouse mode is determined at step 404. Otherwise, the frequency of the received signal is further compared with the center frequency of the guard band that separates the first button of a cordless pen and the left button of a cordless mouse (step 405). If the frequency of the received signal is greater, then a cordless pen mode is determined at step 406. On the other hand, if the received signal frequency is lower, the mode of operation is not changed. In other words, the system continues the previous mode of operation (step 407).

Thus, it can be seen from the foregoing description that the present invention has truly met its stated objectives by providing a digitizer tablet system which can automatically characterize a pointing device for either a cordless mouse or a cordless pen. Also, it allows user selectively control the use of the pointing device as an absolute position device or as a relative movement device on the surface of the digitizer tablet system.

Although this invention has been described with a certain degree of particularity, it is to be understood that the present disclosure has been made by way of preferred embodiments only and that numerous changes in the detailed construction and combination as well as arrangement of parts may be restored to without departing from the spirit and scope of the invention as hereinafter set forth.

What is claimed is:

1. A digitizer tablet system comprising:
   a tablet and a first cordless pointing device, said first cordless pointing device generating an electromagnetic wave;
   a detection loop sensing circuit for detecting an electromagnetic wave;
   a signal processing circuit for processing the detected electromagnetic wave and generating a filtered signal;
   a signal shaping circuit for shaping said filtered signal into a square wave signal;
   a frequency divider for dividing the frequency of said square wave signal and generating a lower frequency square wave signal;
   a micro-controller having an analog to digital converter;
   a frequency counter for counting the frequency of said lower frequency square wave and sending the frequency count to said micro-controller; and
   a half-wave rectifier for rectifying said filtered signal and sending a rectified signal to said analog to digital converter, said rectified signal being digitized and said micro-controller determining the location of said pointing device by processing said digitized signal.

2. A digitizer tablet system according to claim 1, said signal processing circuit comprising a band-pass filter for generating said filtered signal.

3. A digitizer tablet system according to claim 1, wherein the electromagnetic wave generated by said first cordless pointing device has a first frequency for indicating the operation of said first pointing device and a second frequency for indicating the press of a button on said first pointing device.

4. The digitizer tablet system according to claim 3, further comprising a second cordless pointing device, said second pointing device generating an electromagnetic wave having a different frequency as compared to the frequencies of the electromagnetic wave generated by said first pointing device, wherein said first pointing device operates in a first mode and said second pointing device operates in a second mode.

5. The digitizer tablet system according to claim 4, wherein said tablet system is adjusted between said first mode and said second mode automatically depending on the frequency count received by said micro-controller.

6. A method for detecting and changing the operation mode of a digitizer tablet system having first and second cordless pointing devices operating in first and second modes respectively, comprising the steps of:
   presetting the operation of said tablet system to the first mode;
   generating an electromagnetic wave in a first frequency band if a button of said first pointing device is pressed;
   generating an electromagnetic wave in a second frequency band if said second pointing device is in operation, and an electromagnetic wave in a third frequency band if a button of said second pointing device is pressed, said first frequency band being between said second and third frequency bands, said first and second frequency bands having a first frequency guard band in between and said first and third frequency bands having a second frequency guard band in between;
   receiving an electromagnetic wave in said tablet system;
   determining the frequency of the received electromagnetic wave;
   comparing the determined frequency with the center frequency of said first frequency guard band;
   adjusting the operation of said tablet system to the second mode if the determined frequency and said second frequency band are on a same side with respect to said first frequency guard band, otherwise comparing the determined frequency with the center frequency of said second frequency band; and
   adjusting the operation of said tablet system to the first mode if the determined frequency and said first frequency band are on a same side with respect to said second frequency guard band.

7. A method for detecting and changing the operation mode of a digitizer tablet system having first and second cordless pointing devices generating electromagnetic waves in first and second frequency bands respectively, said first and second frequency bands having a frequency guard band in between, comprising the steps of:
   receiving an electromagnetic wave from said tablet system;
   determining the frequency of the received electromagnetic wave; comparing the determined frequency with the center frequency of said frequency guard band;
   adjusting said tablet system for operating in a first mode corresponding to said first pointing device if the determined frequency and said first frequency band are on a same side with respect to said frequency guard band; and
   adjusting said tablet system for operating in a second mode corresponding to said second pointing device if the determined frequency and said second frequency band are on a same side with respect to said frequency guard band.

* * * * *